Patented Feb. 1, 1944

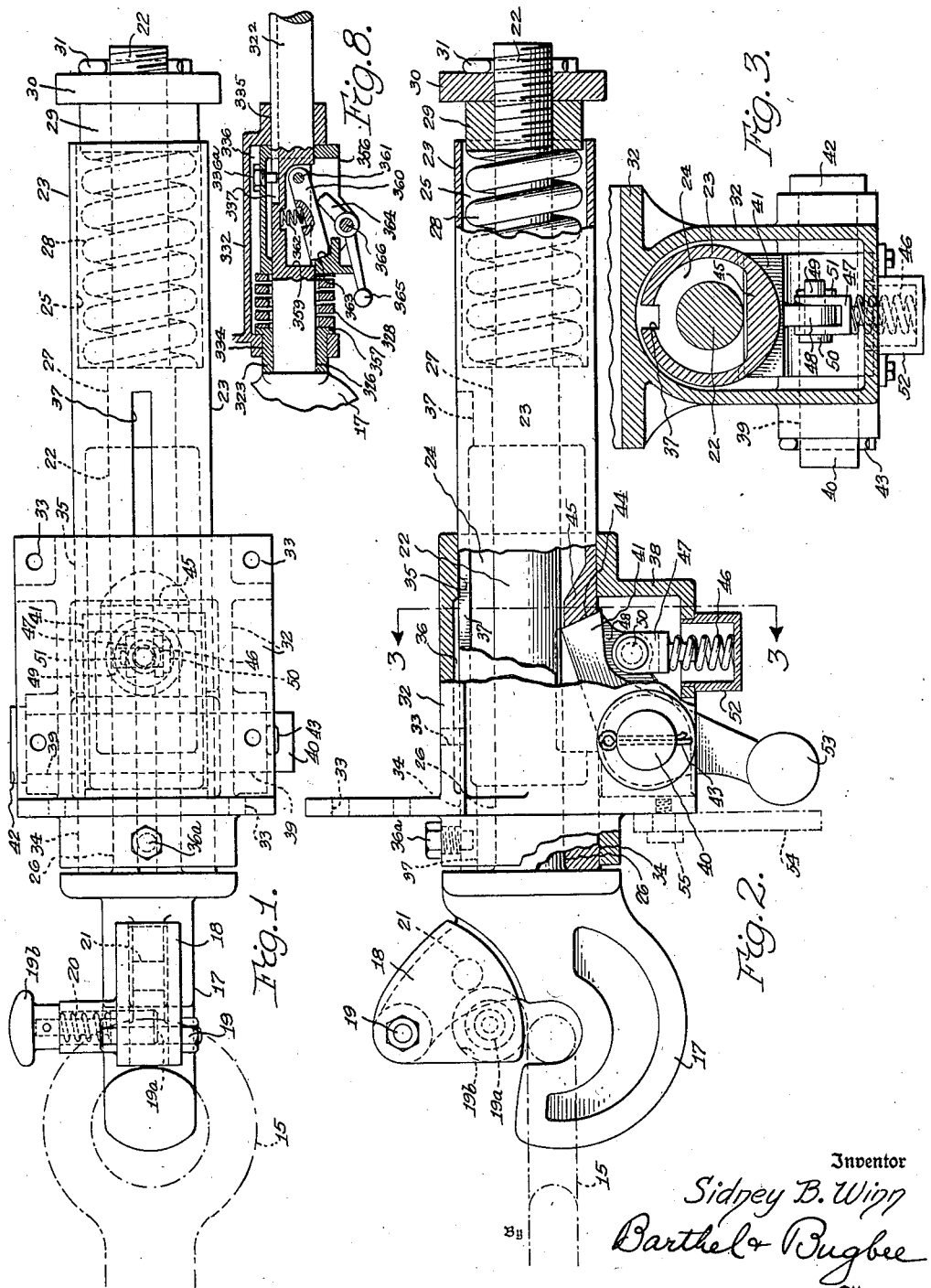

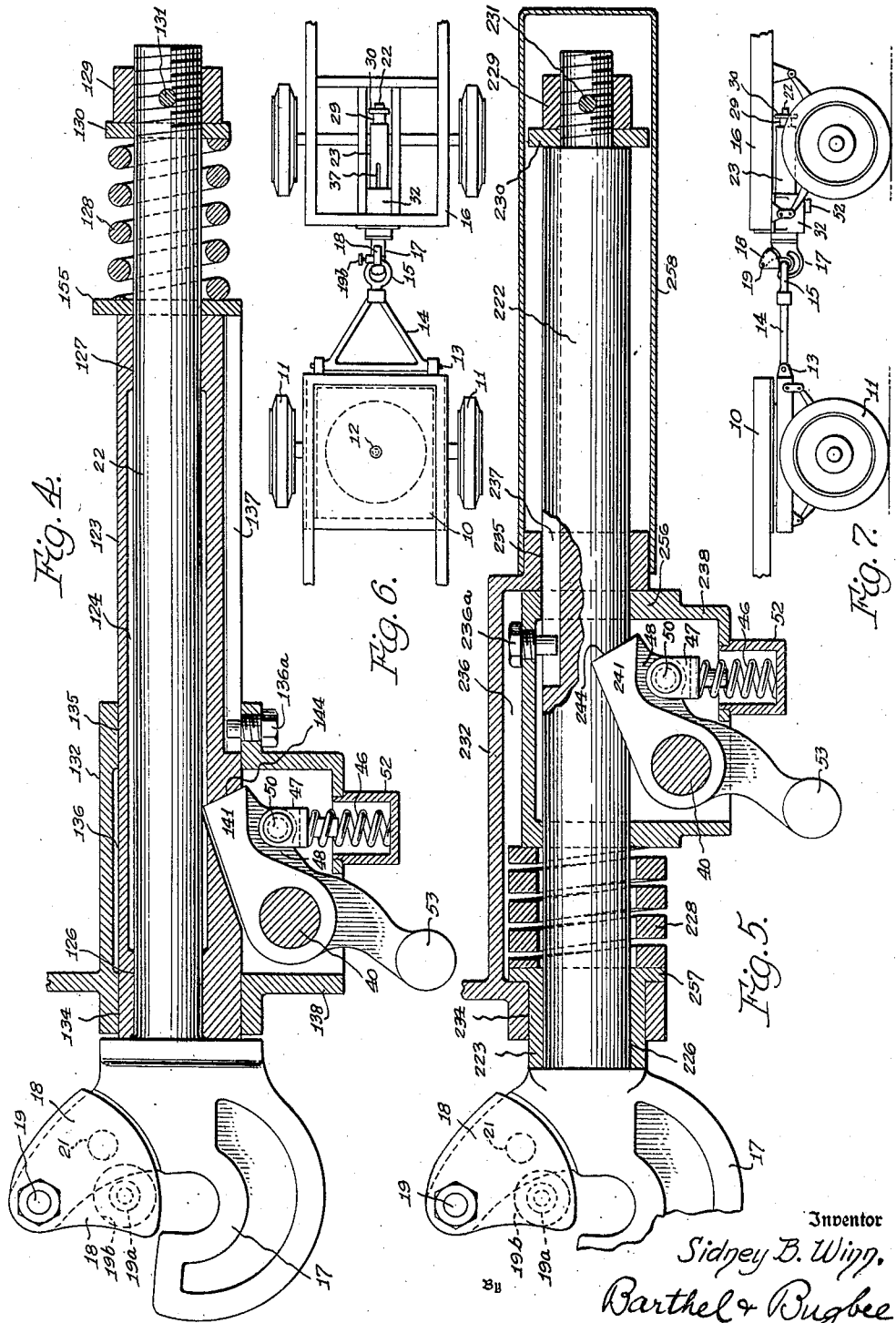

2,340,786

UNITED STATES PATENT OFFICE 2,340,786

EXTENSIBLE PINTLE HOOK TRAILER COUPLING

Sidney B. Winn, Lapeer, Mich.

Application October 20, 1941, Serial No. 415,681

12 Claims. (Cl. 280—15)

This invention relates to a new and useful improvement in extensible pintle hook trailer couplings.

One important object of the invention is to provide a pintle hook on a tractor, to be used to couple with an eye on a draw-bar of a trailer, which may be extended as desired so as to facilitate and expedite coupling.

Another object of the invention is to provide a suitable housing for a pintle hook which will permit axial movement of the pintle hook through the housing when desired.

A further object of the invention is to provide a latch to retain the pintle hook in the housing and a suitable manually operated lever for releasing the latch to permit the pintle hook to be extended.

Still another object of the invention is to provide a safety lock to prevent unlatching of the pintle hook upon failure of the mechanism.

Another object is to position the parts of the device in proper position and to prevent displacement thereof.

Other and further objects and advantages of the invention will become apparent from a reading of the following description wherein reference is made to the accompanying drawings in which:

Figure 1 is a plan view of a preferred embodiment of the device;

Fig. 2 is a side elevation thereof, being partially in section;

Fig. 3 is a sectional view taken along the line 3—3 of Fig. 2;

Fig. 4 is a side elevation of a modification of the invention, being partially in section;

Fig. 5 is a side elevation of another modification of the invention, being likewise partially in section;

Fig. 6 is a plan view of a portion of a tractor and a portion of a trailer coupled together with the present invention installed therein, the same being schematic; and Fig. 7 is a side elevation of the elements shown in Fig. 6.

Fig. 8 is a sectional side elevation of another modification.

A common form of trailer 10 is supported by front wheels 11 rotatable about a vertical axis 12. Pivotally mounted about a transverse axis 13 is a frame 14 to the forward end of which is attached an eye 15.

Such trailers are commonly coupled to a tractor 16 by means of a hook 17 mounted on the tractor. Such a hook 17 fits within the eye 15 to establish a draft connection with the trailer 10. A bifurcated lock member 18 which may swing about the pivot 19 prevents disengagement of the hook 17 and eye 15. The lock member 18 has a pin 19a which is biased by the spring 20 to project into the slot between the bifurcations of the lock member 18. The pin 19a may fit within the hole 21 in one portion of the hook 17, whereupon the lock member is held in unlocked position. The pin 19a may be manually withdrawn from the hole 21 by means of the knob 19b and the lock member 18 pivoted about the pivot 19 to the position shown in Fig. 2, whereupon the lock member 18 is in locked position so as to prevent the eye 15 from leaving the hook 17.

In the common type trailer, when it is desired to couple the tractor 16 to the trailer 10, the driver must back the trailer until the hook 17 is within range of the eye 15 so that the hook and eye may be coupled. This requires a time-consuming, trial-and-error operation until the hook is properly positioned with respect to the eye. Many times it is necessary to employ a helper to direct the driver in making the coupling. The present invention is designed to eliminate the necessity for the major part of the operation above-discussed by making the pintle-hook 17 extensible so that, after the driver has gotten the tractor in approximately the correct position for coupling, the hook 17 may be extended until it is of proper length to make the coupling.

In the present invention a round pintle 22 is attached to the hook 17 and within the sleeve member 23. The sleeve member 23 is recessed at 24 and 25 so as to reduce the area of surface contact between the pintle 22 and the sleeve and thereby reduce the frictional resistance to relative axial movement therebetween. However, bearing portions 26 and 27 hold the pintle 22 in firm axial alignment with the sleeve member 23. Within the recess 25 is a coil spring 28 which encircles an end of the pintle 22 remote from the hook 17 and which has a reduced cross-sectional area. One end of the spring 28 bears against the bearing portion 27 and the other end bears against the collar 29 threaded on the threaded end of the pintle 22.

The collar 29 has an enlarged end portion 30 spaced from the end of the sleeve member 23 which has a diameter larger than the internal diameter of the sleeve member. The enlarged portion 30 of the collar permits a predetermined axial movement of the pintle 22 with respect to the sleeve 23, but prevents further movement. The spring 28 resists any axial movement of the pintle 22 and tends to restore the pintle 22 to the position which it occupies as shown in Fig. 2. The purpose of the spring 28 is to take up the shock of a sudden draft load applied to the hook 17. The collar 29—30 is prevented from coming off the pintle 22 by the cotter pin 31.

The sleeve member 23 is received within the housing 32 which is attached to the frame of the tractor by screws (not shown) which pass through the holes 33. The housing 32 has a bore 34 at its forward end and a bore 35 at its rearward end into which the sleeve member 23 fits so that the latter is held in axial alignment with the bores 34 and 35. The housing 32 is recessed interiorly at 36 so as to reduce the area of surface contact between the sleeve 23 and the interior of the housing 32 and thereby reduce frictional resistance to relative axial movement between the sleeve and the housing. A screw 36a passes through the housing, and its end fits within a longitudinal slot 37 in the sleeve 23, the slot 37 having a width slightly greater than the diameter of the screw 36a. The screw 36a prevents relative rotation between the housing 32 and the sleeve 23.

In the lower part of the housing 32 is a boss 38 projecting downwardly. A transverse bore 39 through the boss receives a pin 40 on which is mounted a latch member 41. The pin 40 is held in place by an enlarged head 42 at one end and a cotter pin 43 passing through the pin at its other end. A notch 44 is cut into the lower portion of the sleeve 23 to receive the latch 41 and behind the notch is a thickened reinforcing portion 45. A spring 46 is designed to bear against the latch 41 to force it into position in the notch 44 as shown in Fig. 2, in which position axial movement of the sleeve 23 with respect to the housing 32 is prevented. To perform this function the spring 46 is provided at its upper end with a yoke 47 which fits about a tongue 48 attached to the latch 41. The tongue is held in the yoke 47 by a pin 49 held in place by its enlarged head 50 and a cotter pin 51 through the opposite end. The lower end of the spring 46 bears against a cup-shaped member 52 fitting into the boss 38.

A lever 53 is integral with the latch 41 and projects out of the boss 38 so that it may be grasped by the operator. By pulling upward on the lever 53 the latch 41 is disengaged from the notch 44 and the sleeve 23 may be moved manually axially relative to the housing 32. A safety member 54 may be provided to prevent upward movement of the lever 53 in case the spring 46 or some other part of the mechanism should fail. The safety member 54 is swiveled about a bolt 55 in the boss 38 so that it may be moved out of the way when it is desired to lift the lever 53.

In operation the driver of the tractor 16 backs the same so that the hook 17 is within range of the eye 15 on the trailer 10. The safety member 54 is then swiveled out of the way and the lever 53 is lifted, disengaging the latch 41 from the notch 44. This permits the operator to pull the pintle-hook 17 and together with it the sleeve 23 longitudinally through the housing 32, although complete separation of the sleeve 23 and the housing 32 is prevented by reason of the fact that the diameter of the enlarged portion 30 of the collar 29 is greater than the internal diameter of the bore 35 in the housing 32. Meanwhile the trailer frame 14 may be manually swiveled about the axis 12 so as to point the eye 15 in the direction of the hook 17. The hook 17 and the sleeve 23 are pulled through the housing 32 the proper distance so as to establish contact with the eye 15. The lock member 18 is then manually moved from unlocked position to locked position, as shown in Fig. 2, so as to prevent separation of the eye 15 from the hook 17. The driver of the vehicle then backs the tractor 16, thereby causing the pintle 22 and sleeve 23 to be forced back within the housing 32 until the latch 41 fits within the notch 44. The safety member 54 then returns by gravity to the position shown in Fig. 2, preventing raising of the lever 53 until the safety member 54 is swiveled out of the way. After the latch 41 is seated within the notch 44, the tractor 16 may be driven forward or rearward and a proper connection is established with the trailer 10.

A modification of the invention is shown in Fig. 4. The chief difference over the preferred embodiment is that in this modification the spring 128 is external with respect to the sleeve 123. The sleeve 123 has an elongated recess 124 so that it contacts the enclosed pintle 22 only at the bearings 126 and 127. The end of the sleeve is provided with a collar 155, having a diameter greater than the internal diameter of the bore 135 of the housing 132 within which the sleeve 123 fits. Relative rotation between the housing 132 and the sleeve 123 is prevented by the screw 136a which fits through the housing 132 into a longitudinal slot 137 in the sleeve 123.

The threaded end of the pintle 22, remote from the hook 17, is provided with a collar 129 held in place by a pin 131. The collar 129 has an enlarged portion 130 having a diameter greater than the internal diameter of the collar 155. A spring 128 fits around the pintle 22 and bears against the collars 155 and 130, between which it is positioned. The spring 128 takes up the shock of a draft load on the hook 17, the spring flexing to permit relative movement between the pintle 22 and the sleeve 123, but restoring the pintle to proper position after the load becomes constant.

Extension of the pintle hook 17 is accomplished in a manner quite similar to that of the form shown in Figs. 1 and 2. The lever 53 is lifted against the pressure of the spring 46 until the latch 141 is clear of the notch 144. The sleeve 123 may then be drawn through the housing 132 manually by pulling on the hook 17. The collar 155 provides a stop in that it hits the housing 132 at the limit of the movement.

The modification shown in Fig. 5 differs principally in that the spring 228 is designed to take the shock both of acceleration and deceleration of the trailer 10 with respect to the tractor 16. The housing 232 is suitably attached to the tractor 10. The pintle 222 is attached to the hook 17 and fits within the sleeve 223, which in turn fits within the bore 234 in the housing 232. The pintle 222 passes out through the housing 232, fitting within the bore 235 thereof so that the pintle 222 is firmly aligned with respect to the bores 234 and 235.

A member 256 likewise fits about the pintle 222 and is supported thereby. A pin 40 is received by the member 256 and supports the latch 241 which is integral with the handle 53. The latch 241 may be rotated on the pin 40 within the member 256 against the resistance of the spring 46 which bears against the yoke 47 which is attached to the latch 241 by the pin 50, the other end of the spring 46 abutting the cup-shaped member 52 attached to the member 256.

The latch 241 fits within a notch 244 in the pintle 222 so that when the latch 241 is engaged in the notch 244 relative movement of the pintle 222 with respect to the member 256 is prevented. Rotative movement between the latter elements is prevented by the screw 236a which passes through the member 256 into the longitudinal slot 237 in the pintle 222.

When it is desired to extend the hook 17, the lever 53 is raised, disengaging the latch 241 from the notch 244. The hook 17 is then pulled and the pintle 222 slides through the sleeve 223 and the bore 235, which have the same diameter. This movement is limited by the enlarged portion 230 of the collar 229 which has a larger diameter than that of the bore 235 and accordingly abuts the housing 232 at the end of the movement. It will be observed that in this modification the sleeve 223 remains within the housing 232 on extension of the hook 17 because it is provided with a collar 257 having a diameter greater than that of the bore 234 of the housing 232.

Interposed between and bearing against the collar 257 and the member 256 and encircling the pintle 222 is a spring 228, which is designed to take up shock. When there is an acceleration of the tractor 16 the housing 232, which is fastened to the tractor, tends to force the collar 257 to the right, as shown in Fig. 5. This force is cushioned by the spring 228 as it is transmitted to the member 256 and thence to the pintle 222 through the latch 241. Hence the sudden shock is not transmitted to the trailer 10. This results in a temporary separation of the member 256 from abutment with the housing 232, but after a constant velocity is reached the spring 228 restores the two to abutting relation.

When there is a deceleration of the tractor 16, the inertia of the trailer 10 transmits a force to the hook 17, against which the sleeve 223 abuts. The shock of this force is cushioned as it is transmitted by the spring 228 to the member 256 and thence to the housing 232 and thence to the tractor 16. To accomplish this result, the sleeve 223 extends beyond the housing 232.

A sleeve 258 may optionally be inserted in the housing 232 to extend over the pintle 222 to protect the pintle from dust and other damage. It will be understood that such a dust-protecting shield may be applied in any of the modifications shown in this application.

The modification illustrated in Fig. 8 shows how the invention may be varied so that the latch is in the extensible portion and the latch receiver in the housing. A housing 332 is suitably attached to the tractor. The pintle 322 is attached to the hook 17 and fits within the bearing 326 of the sleeve 323, which in turn fits within the bore 334 of the housing 332. The pintle 322 passes out through the housing 332, fitting within the bore 335 thereof, so that the pintle 322 is firmly aligned with respect to the bores 334 and 335.

A member 356 likewise fits about the pintle 322 and is supported thereby. Rotative movement between the pintle 322 and member 356 is prevented by the screw 336a which passes through the member 356 and into the longitudinal slot 337 in the pintle 322.

The sleeve 323 has an enlarged collar 357 which prevents the sleeve 323 from being drawn through the bore 334. Interposed between and bearing against the collar 357 and the member 356 and encircling the pintle 322 is a spring 328, which is designed to take up shock during acceleration and deceleration of the tractor and trailer in a manner similar to that of the modification shown in Fig. 5.

The pintle 322 is provided with a hollow chamber 359 within which is a latch member 360 pivoted about a pin 361 set in the pintle 332. A spring 362 may be interposed between the latch member 360 and the top of the chamber 359 to assist the force of gravity in urging the latch 360 downwardly so that it will project out of the chamber 359. However, the latch member 360 is capable of being wholly contained within the chamber 359 so as to permit the pintle 322 to slide axially with respect to the member 356, spring 328 and sleeve 323.

In the member 356 is a latch receiving abutment 363 against which the latch 360 abuts when in latched position. When in such position, relative extension movement between the pintle 322 and the member 356 is prevented. In order to unlatch the latch 360 from abutment 363, a lever 364 is provided having a handle 365 on the opposite end and being pivotally mounted midway between its ends on a pin 366 extending into the member 356. By pressing downward on the handle 365 the lever 364 is brought to bear on the latch 360, moving it upward into the chamber 359 and free of abutment 363. The pintle 322 may then be extended.

When the pintle 322 is pushed back after coupling has been effected, when the latch 360 is past the abutment 363 it drops downward and the device is automatically in latched position again.

Although the modification shown in Fig. 8 has been shown applied to an arrangement similar to that shown in Fig. 5, it will be understood that by slight modification it might also be applied to the other forms of pintle hooks disclosed in this application, by pivotally mounting a similar latch within the sleeves 23 or 123 of the other types.

Whereas I have specifically pointed out, illustrated and described my invention, nevertheless it will be understood that certain modifications may be made therein without departing from the spirit of the invention as set forth in the appended claims.

What I claim is:

1. In a coupling for a trailer, a support member, an extensible coupling member, latch means on one of said members, latch-receiving means on the other of said members, said latch means and latch receiving means being positioned intermediate the ends of said extensible coupling member and means on the end of the extensible coupling member independent of the latch receiving means for engaging the support member to permit separation of said coupling member and support member.

2. In a coupling for a trailer, a support member, an extensible coupling member, latch means on one of said members, latch-receiving means on the other of said members, said latch means and latch receiving means being positioned intermediate the ends of said extensible coupling member, and means on one end of the coupling member independent of the latch and latch receiving means for retaining said extensible coupling member within said support member upon failure of said latch means and latch-receiving means.

3. In a coupling for a trailer, a support member, an extensible member, latch means, and latch-receiving means positioned intermediate the end of the extensible member for locking the support member and extensible member in draft engagement, and means independent of said latch and latch receiving means for engaging the support when the coupling member and support are out of draft engagement said extensible member comprising a coupling element and a sleeve receiving said coupling element and permitting relative axial movement therewith.

4. In a coupling for a trailer, a support member, an extensible member, latch means, and latch-receiving means positioned intermediate the ends of the extensible member, said extensible member comprising a coupling element, a sleeve receiving said coupling element and permitting relative axial movement therewith resilient means associated with said sleeve and coupling element to dampen said relative axial movement and independent means on one end of the extensible member for engaging the support member when the extensible member is extended.

5. In a coupling for a trailer, a support member, an extensible coupling member, latch means, latch-receiving means, said latch means being engageable for draft engagement and being disengageable from said latch-receiving means to permit relative longitudinal movement between said extensible coupling member and said support member, means independent of the latch means carried by the extensible member for engaging the support member when the latch means is out of draft engagement and means to prevent accidental unlatching of said latch means when the extensible member and support are in draft engagement.

6. In a coupling for a trailer, a support, latch means in said support, an extensible coupling member, a sleeve slidable longitudinally on said coupling member and movable longitudinally in said support, resilient means between the extensible coupling element and sleeve for limiting longitudinal movement therebetween and latch-receiving means in said sleeve for locking said sleeve to said support.

7. In a coupling for a trailer, a support, latch means in said support, an extensible coupling member, a sleeve slidable longitudinally on said coupling member and movable longitudinally in said support, latch-receiving means in said sleeve, and resilient means between the coupling element and sleeve to limit slidable movement thereof within said sleeve.

8. In a coupling for a trailer, a support, latch means in said support, a sleeve slidable longitudinally in said support, latch-receiving means in said sleeve, a coupling element slidable within said sleeve, a longitudinal slot in said sleeve, and means projecting from said support into said slot.

9. In a coupling for a trailer, a support, latch means in said support, a sleeve slidable longitudinally in said support, latch-receiving means in said sleeve, a coupling element slidable within said sleeve, and shock-absorbing means interposed between said coupling element and said support.

10. In a coupling for a trailer, a support, latch means in said support, a sleeve slidable longitudinally in said support, latch-receiving means in said sleeve, a coupling element slidable within said sleeve, a chamber in said sleeve, and resilient means within said chamber to absorb shock between said coupling element and said sleeve.

11. In a coupling for a trailer, a support, latch means in said support, a sleeve slidable longitudinally in said support, a coupling element extending through and beyond said sleeve, means for preventing relative rotational movement between the coupling element and support, seating means on said coupling element adapted to engage the support and limit sliding movement relative thereto, and shock-absorbing means interposed between said sleeve and said seating means.

12. In a coupling for a trailer, a support, a coupling element slidable through said support, a sleeve slidable in said support and engaging a portion of said coupling element, a latch-carrying member supported within said support, a latch in said latch-carrying member, latch-receiving means in said coupling element, and resilient means about said coupling element interposed between said sleeve and said latch-carrying member to absorb draft shock of said coupling element.

SIDNEY B. WINN.